US012686935B2

(12) United States Patent
Ballantine et al.

(10) Patent No.: US 12,686,935 B2
(45) Date of Patent: *Jul. 21, 2026

(54) SYSTEMS AND METHODS OF AMMONIA SYNTHESIS

(71) Applicant: Ohmium International, Inc., Newark, CA (US)

(72) Inventors: Arne Ballantine, Incline Village, NV (US); Chockkalingam Karuppaiah, Fremont, CA (US)

(73) Assignee: Ohmium International, Inc., Newark, CA (US)

( * ) Notice: Subject to any disclaimer, the term of this patent is extended or adjusted under 35 U.S.C. 154(b) by 653 days.

This patent is subject to a terminal disclaimer.

(21) Appl. No.: 18/110,213

(22) Filed: Feb. 15, 2023

(65) Prior Publication Data

US 2023/0203686 A1 Jun. 29, 2023

Related U.S. Application Data

(62) Division of application No. 17/101,224, filed on Nov. 23, 2020, now Pat. No. 11,603,599.

(Continued)

(51) Int. Cl.
*C25B 15/08* (2006.01)
*B01D 53/32* (2006.01)
(Continued)

(52) U.S. Cl.
CPC .......... *C25B 15/083* (2021.01); *B01D 53/326* (2013.01); *B01J 8/0278* (2013.01);
(Continued)

(58) Field of Classification Search
CPC .... B01D 53/326; B01J 8/0278; C01C 1/0405; C01C 1/0458; C01C 1/0494; C25B 1/02;
(Continued)

(56) References Cited

U.S. PATENT DOCUMENTS

| | | | |
|---|---|---|---|
| 4,153,673 A | 5/1979 | Becker | |
| 4,180,553 A | 12/1979 | Null et al. | |

(Continued)

FOREIGN PATENT DOCUMENTS

| | | |
|---|---|---|
| CN | 103237599 A | 8/2013 |
| DE | 102014217462 A1 | 3/2016 |

(Continued)

OTHER PUBLICATIONS

PCT Application No. PCT/US2024/015419, International Preliminary Report on Patentability dated Aug. 21, 2025.

(Continued)

*Primary Examiner* — Dapinder Singh
(74) *Attorney, Agent, or Firm* — Polsinelli LLP

(57) ABSTRACT

A system for synthesizing ammonia includes a reactor including an inlet portion, an outlet portion, and an energy source arranged to deliver energy to one or more reactants receivable through the inlet portion of the reactor, and the energy source activatable to reduce nitrogen to ammonia in the presence of hydrogen, at least one hydrogen pump in fluid communication with the outlet portion of the reactor, each hydrogen pump including at least one electrochemical cell, and a recirculation circuit in fluid communication between the at least one hydrogen pump and the inlet portion of the reactor and configured to direct a respective hydrogen stream from each hydrogen pump to the inlet portion of the reactor.

13 Claims, 8 Drawing Sheets

Related U.S. Application Data

(60) Provisional application No. 62/938,450, filed on Nov. 21, 2019.

(51) Int. Cl.

| | | |
|---|---|---|
| *B01J 8/02* | (2006.01) | |
| *C01C 1/04* | (2006.01) | |
| *C25B 1/04* | (2021.01) | |
| *C25B 1/27* | (2021.01) | |
| *C25B 9/19* | (2021.01) | |
| *C25B 9/73* | (2021.01) | |

(52) U.S. Cl.
CPC .......... *C01C 1/0405* (2013.01); *C01C 1/0494* (2013.01); *C25B 1/04* (2013.01); *C25B 1/27* (2021.01); *C25B 9/19* (2021.01); *C25B 9/73* (2021.01)

(58) Field of Classification Search
CPC .... C25B 1/04; C25B 1/27; C25B 9/19; C25B 9/70; C25B 11/04; C25B 13/00; C25B 15/083
See application file for complete search history.

(56) References Cited

U.S. PATENT DOCUMENTS

| | | | |
|---|---|---|---|
| 6,994,929 B2 | 2/2006 | Barbir et al. | |
| 7,300,642 B1 * | 11/2007 | Pedersen ............... | C10K 1/143 |
| | | | 518/703 |
| 8,015,808 B2 | 9/2011 | Keefer et al. | |
| 8,669,499 B2 | 3/2014 | Conrad | |
| 9,634,343 B2 | 4/2017 | Munier et al. | |
| 10,597,301 B2 * | 3/2020 | Kawasaki ............. | B01D 53/22 |
| 10,683,644 B2 | 6/2020 | Kim et al. | |
| 10,815,442 B2 | 10/2020 | Yoon | |
| 11,603,599 B2 * | 3/2023 | Ballantine ................ | C25B 1/02 |
| 2004/0142215 A1 | 7/2004 | Barbir et al. | |
| 2005/0034479 A1 * | 2/2005 | Ji ........................ | B01D 61/362 |
| | | | 95/47 |
| 2010/0282689 A1 | 11/2010 | Ganzi et al. | |
| 2012/0100062 A1 | 4/2012 | Nakamura et al. | |
| 2012/0202279 A1 | 8/2012 | Murahara | |
| 2013/0288143 A1 | 10/2013 | Lee | |
| 2016/0193564 A1 * | 7/2016 | Badwal ................... | B01J 35/59 |
| | | | 502/4 |
| 2016/0288114 A1 * | 10/2016 | Way ........................ | B01J 23/50 |
| 2016/0369411 A1 | 12/2016 | Handagama et al. | |
| 2017/0152149 A1 | 6/2017 | Malmali et al. | |
| 2017/0233878 A1 | 8/2017 | Yakumaru et al. | |
| 2017/0321329 A1 | 11/2017 | Spurgeon | |
| 2018/0305828 A1 | 10/2018 | Takanami et al. | |
| 2019/0092645 A1 | 3/2019 | Kawasaki et al. | |
| 2019/0382903 A1 | 12/2019 | Johanning et al. | |
| 2021/0155491 A1 | 5/2021 | Ballantine et al. | |
| 2021/0340683 A1 | 11/2021 | Zhang et al. | |
| 2021/0395902 A1 | 12/2021 | Tamura et al. | |
| 2022/0032228 A1 | 2/2022 | Yen | |
| 2022/0033984 A1 | 2/2022 | Light | |
| 2022/0388855 A1 | 12/2022 | Dincer et al. | |
| 2023/0010889 A1 | 1/2023 | Kajino et al. | |
| 2023/0175144 A1 | 6/2023 | Ballantine | |
| 2023/0191319 A1 | 6/2023 | Shrivastava et al. | |
| 2023/0203682 A1 | 6/2023 | Yan et al. | |
| 2023/0357941 A1 | 11/2023 | Ballantine et al. | |
| 2024/0271291 A1 | 8/2024 | Ballantine et al. | |
| 2025/0129487 A1 | 4/2025 | Kondo et al. | |
| 2026/0054217 A1 | 2/2026 | Karuppaiah et al. | |

FOREIGN PATENT DOCUMENTS

| | | |
|---|---|---|
| EP | 4061771 | 9/2022 |
| EP | 4519204 | 3/2025 |
| JP | 2013-209684 | 10/2013 |
| JP | 2014-162662 | 9/2014 |
| JP | 2016-209810 | 12/2016 |
| JP | 2025-515190 | 5/2025 |
| KR | 10-2020-0003736 | 1/2020 |
| TW | 202128562 A | 8/2021 |
| WO | WO 2007/124390 | 11/2007 |
| WO | 2008070714 A1 | 6/2008 |
| WO | 2009056888 A1 | 5/2009 |
| WO | 2011023865 A1 | 3/2011 |
| WO | 2013113631 A1 | 8/2013 |
| WO | 2018236649 A1 | 12/2018 |
| WO | WO 2020/000020 | 1/2020 |
| WO | WO 2021/102400 | 5/2021 |
| WO | 2022035792 A1 | 2/2022 |
| WO | WO 2022/026523 | 2/2022 |
| WO | 2022207227 A1 | 10/2022 |
| WO | 2022253456 A1 | 12/2022 |
| WO | 2023001426 A1 | 1/2023 |
| WO | 2023215639 A1 | 11/2023 |
| WO | WO 2024168349 | 8/2024 |
| WO | 2026043717 A1 | 2/2026 |

OTHER PUBLICATIONS

PCT Application No. PCT/US23/21382, International Search Report and Written Opinion mailed Sep. 13, 2023.

PCT Application No. PCT/US24/15419, International Search Report and Written Opinion mailed May 6, 2024.

PCT Application No. PCT/US23/21382, International Preliminary Report on Patentability dated Nov. 21, 2024.

U.S. Appl. No. 17/387,170, Final Office Action dated Oct. 31, 2024.

Notice of Decision in UAE Application No. P6000939/2022 dated Oct. 5, 2024.

Examination Report in IN Application No. 202217033806 dated Nov. 4, 2024.

Office Action in TW Application No. 109141026 dated Jul. 10, 2024.

Chisholm, G. et al., "3D printed flow plates for the electrolysis of water: an economic and adaptable approach to device manufacture," Energy Environmental Science, vol. 7, pp. 3026-3032, Jul. 2014.

PCT Application No. PCT/US2020/061765, International Preliminary Report on Patentability dated May 17, 2022.

PCT Application No. PCT/US2020/061765, International Search Report and Written Opinion mailed Mar. 18, 2021.

PCT Application No. PCT/US2021/043410, International Preliminary Report on Patentability dated Jan. 31, 2023.

PCT Application No. PCT/US2021/043410, International Search Report and Written Opinion mailed Nov. 9, 2021.

Ginsberg et al., "Integrating Solar Energy, Desalination and Electrolysis," accessed at https://www.osti.gov/servlets/purl/1976411, Nov. 3, 2021.

EP Application No. 208901330.0, Extended European Search Report dated Nov. 4, 2024.

U.S. Appl. No. 17/387,170, Office Action dated Jun. 7, 2024.

Liu et al., "Water and Metal-Organic Frameworks: From Interaction toward Utilization," Chem. Rev. 2020, 120, 8303-8377.

Opekar et al., "Contactless Impedance Sensors and Their Application to Flow Measurements," Sensors 2013, 13, 2786-2801.

U.S. Appl. No. 19/300,184, Chockkalingam Karuppaiah, Electrochemical Compression for Hydrogen Recovery and High Plant Yield in Ammonia Synthesis Processes, filed Aug. 14, 2025.

PCT/US25/42051, WO, Chockkalingam Karuppaiah, Electrochemical Compression for Hydrogen Recovery and High Plant Yield in Ammonia Synthesis Processes, Aug. 14, 2025.

PCT Application No. PCT/US2025/042051, International Search Report and Written Opinion dated Dec. 15, 2025.

Gao, J. et al., "Direct electrosynthesis and separation of ammonia and chlorine from waste streams via a stacked membrane-free electrolyzer," Nature Communications, vol. 15, Sep. 30, 2024. DOI: https://doi.org/10.1038/s41467-024-52830-4.

Hou, D. et al., "Nickel-Based Membrane Electrodes Enable High-Rate 2 Electrochemical Ammonia Recovery," Environmental Science & Technology, vol. 52, No. 15, Jun. 25, 2018. DOI: https://doi.org/10.1021/acs.est.8b01349.

(56) References Cited

OTHER PUBLICATIONS

Komkova, M. A. et al., "Facilitated transport of ammonia in ultra-thin Prussian Blue membranes with potential-tuned selectivity," Journal of Membrane Science, vol. 639, Dec. 1, 2021. DOI: https://doi.org/10.1016/j.memsci.2021.119714.

Nordio, M. et al., "Experimental and modelling study of an electrochemical hydrogen compressor," Chemical Engineering Journal, vol. 369, Mar. 12, 2019, pp. 432-442. DOI: https://doi.org/10.1016/j.cej.2019.03.106.

U.S. Appl. No. 18/144,727, Non-Final Office Action dated Jan. 30, 2026.

EP Application No. 23800127.5, Extended European Search Report dated Apr. 22, 2026.

Rouwenhorst, K. et al., "Islanded ammonia power systems: Technology review & conceptual process design," Renewable and Sustainable Energy Reviews, vol. 114, Aug. 23, 2019, 15 pages.

Kugler, K. et al., "Co-generation of Ammonia and H2 from H2O Vapor and N2 Using a Membrane Electrode Assembly," Chemie Ingenieur Technik, vol. 92, No. 1-2, Dec. 10, 2019, pp. 62-69.

* cited by examiner

SYSTEMS AND METHODS OF AMMONIA SYNTHESIS

CROSS-REFERENCE TO RELATED APPLICATIONS

This application is a divisional of U.S. application Ser. No. 17/101,224, filed on Nov. 23, 2020, which claims the benefit of U.S. Provisional Patent Application No. 62/938,450, filed on Nov. 21, 2019, the entire contents of which are incorporated herein by reference.

FIELD

The present disclosure is directed to chemical production in general and, more specifically, to systems and methods of ammonia synthesis.

BACKGROUND

Ammonia is common inorganic chemical having a variety of uses, such as fertilizer production, pharmaceutical manufacturing, and cleaning. Although ammonia is naturally occurring, the demand for ammonia for these and other uses far exceeds the amount of ammonia that can be efficiently and responsibly collected from sources in nature. Thus, industrial-scale processes are typically used to synthesize ammonia from nitrogen and hydrogen. The economic viability of ammonia synthesis, however, depends on achieving high yield. In turn, the high temperatures and pressures required to achieve such high yield in ammonia synthesis present logistical challenges, in terms of resources and safety, that limit where ammonia can be synthesized. Accordingly, there remains a need for ammonia synthesis that can be carried out cost-effectively using low yield reactors that are amenable to safe implementation in a wide range of locations, including resource-constrained areas.

SUMMARY

One embodiment provides a system for synthesizing ammonia which includes a reactor including an inlet portion, an outlet portion, and an energy source arranged to deliver energy to one or more reactants receivable through the inlet portion of the reactor, and the energy source activatable to reduce nitrogen to ammonia in the presence of hydrogen, at least one hydrogen pump in fluid communication with the outlet portion of the reactor, each hydrogen pump including at least one electrochemical cell, and a recirculation circuit in fluid communication between the at least one hydrogen pump and the inlet portion of the reactor and configured to direct a respective hydrogen stream from each hydrogen pump to the inlet portion of the reactor.

Another embodiment provides a system for formation of ammonia, comprising a plurality of reactors including one or more synthesis cells activatable to reduce nitrogen to ammonia in the presence of hydrogen, each synthesis cell including an anode, a cathode, and a proton exchange membrane or electrolyte located between the anode and the cathode, and an absorber in fluid communication between a first reactor and a second reactor of the plurality of reactors, the absorber arranged to remove ammonia flowing along a product stream from the first reactor toward the second reactor.

Another embodiment provides a method of ammonia synthesis, comprising delivering nitrogen from a nitrogen source to an inlet portion of a reactor, delivering hydrogen from a hydrogen source to the inlet portion of the reactor, reacting nitrogen and hydrogen in the reactor to form products including ammonia, nitrogen, and hydrogen at an outlet portion of the reactor, concentrating hydrogen from the outlet portion of the reactor into a stream of pressurized hydrogen, wherein concentrating hydrogen into the stream of pressurized hydrogen includes electrochemical pumping of hydrogen, and recirculating at least a portion of the stream of pressurized hydrogen to the inlet portion of the reactor.

BRIEF DESCRIPTION OF THE FIGURES

Like reference symbols in the various drawings indicate like elements.

DETAILED DESCRIPTION

Figure 1A:
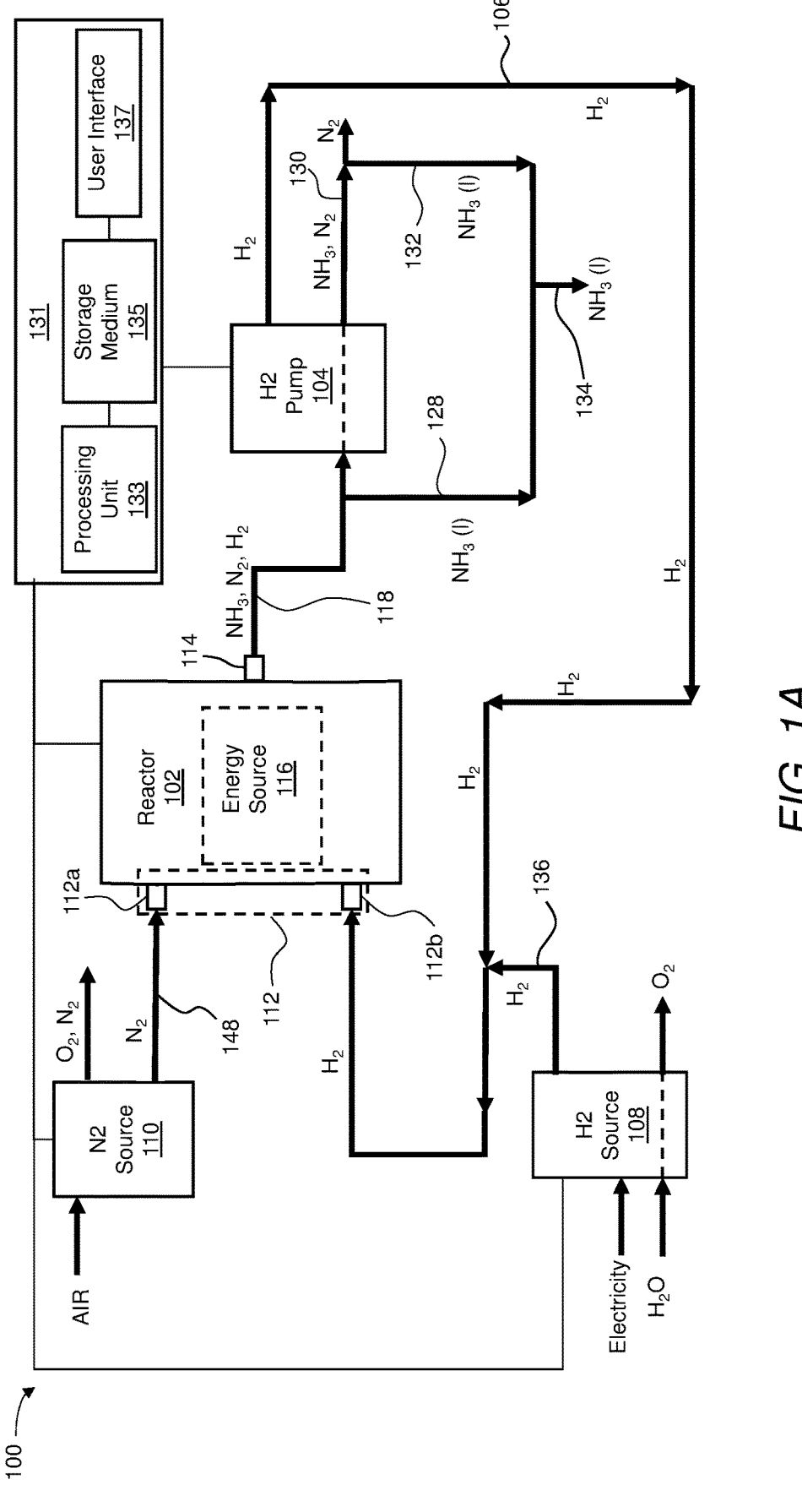
FIG. 1A is a block diagram of a system of a first embodiment for synthesizing ammonia, the system including a cascade of hydrogen pumps and a recirculation circuit for recirculating hydrogen to an inlet portion of a reactor.

The embodiments will now be described more fully hereinafter with reference to the accompanying figures, in which exemplary embodiments are shown. The foregoing may, however, be embodied in many different forms and should not be construed as limited to the exemplary embodiments set forth herein. All fluid flows may flow through conduits (e.g., pipes and/or manifolds) unless specified otherwise.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

In the description that follows, various aspects of systems and methods are described in the context of ammonia, given that the synthesis of ammonia has both important industrial applicability and is demonstrative of various different features of systems and methods of the present disclosure. Nevertheless, unless otherwise specified or made clear from the context, it shall be understood that any one or more of the various different systems and methods described herein may be additionally, or alternatively, used to form any one or more of various different chemicals. For example, unless a contrary intent is indicated, any one or more of the various different systems and methods described herein may be used to form any chemical that may be efficiently produced using electrochemical pumping to recirculate the one or more reactants into a reactor to make more efficient use of the one or more reactants—effectively increasing overall yield of the chemical formation process and, in some cases, making low yield reactors economically viable options for commercial-scale formation of certain chemicals.

As used herein, the term "yield" is used in a manner consistent with the well-known use of this term in chemical reaction engineering. Thus, unless otherwise specified or made clear from the context, the term yield shall be understood to refer to the ratio of the actual mass of an intended product produced to the theoretical mass of the intended product, expressed as a fraction or as a percentage. For instance, in examples related to synthesis of ammonia from hydrogen and nitrogen, the yield of a reactor is the ratio of the actual mass of ammonia produced by the reactor to the theoretical mass of ammonia producible from hydrogen and nitrogen if all reactions go to completion.

Further, unless otherwise specified or made clear from the context, the term "minimum economically viable yield" or variants thereof shall be understood to refer to a minimum yield at which the value of the yielded product is greater than the total cost (e.g., reactants, reactant precursors, energy, etc.) required to achieve the given yield of the product. The exact value of the minimum economically viable yield may vary according to factors such as local conditions, market prices of reactants or reactant precursors, or market prices of the yielded product. Nevertheless, as may be appreciated in the discussion that follows, the minimum economically viable yield may be a useful comparator. That is, it shall be understood to be generally desirable to decrease the minimum economically viable yield. Similarly, it shall be understood to be generally undesirable to increase the minimum economically viable yield.

Figure 1B:
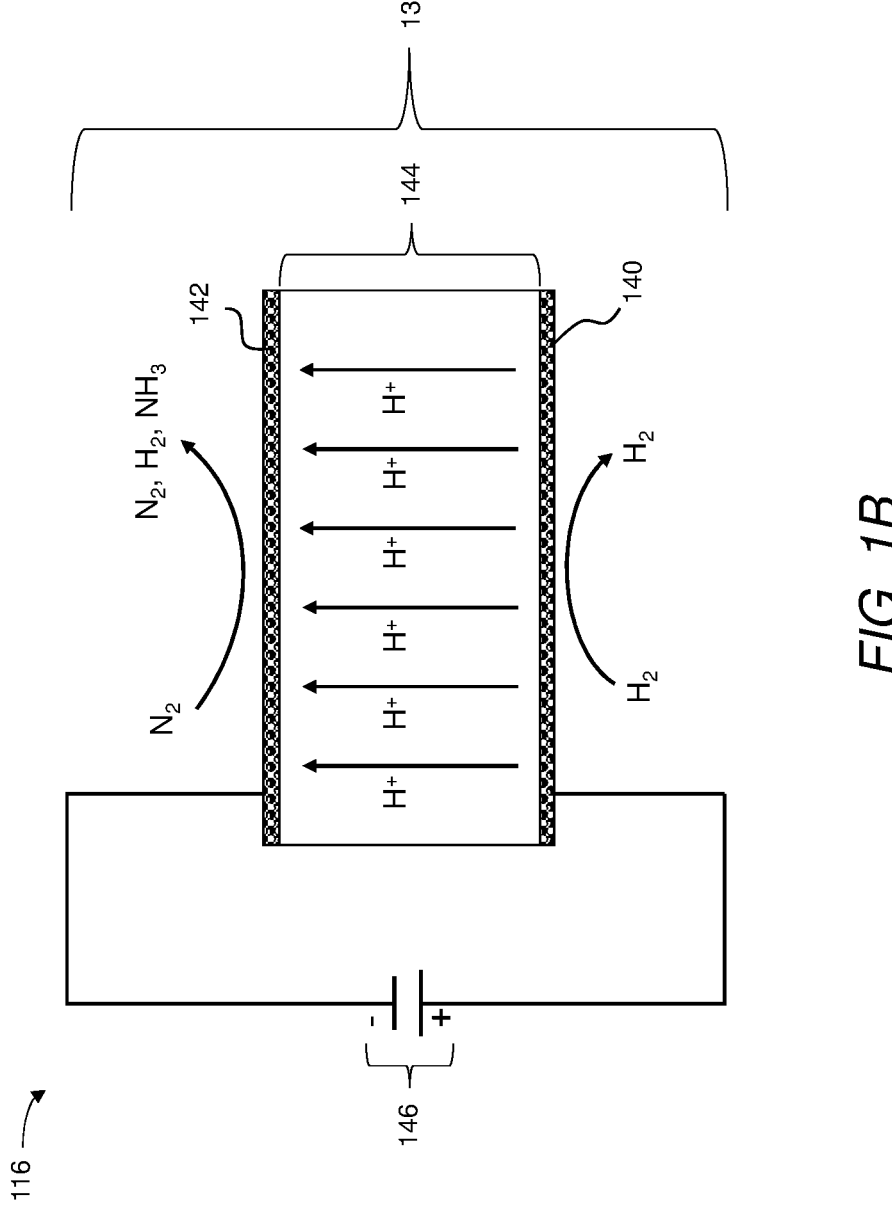
FIG. 1B is a schematic representation of an energy source of the reactor of the system of FIG. 1A, with the energy source including a synthesis cell activatable to form ammonia from hydrogen and nitrogen.
Figure 1C:
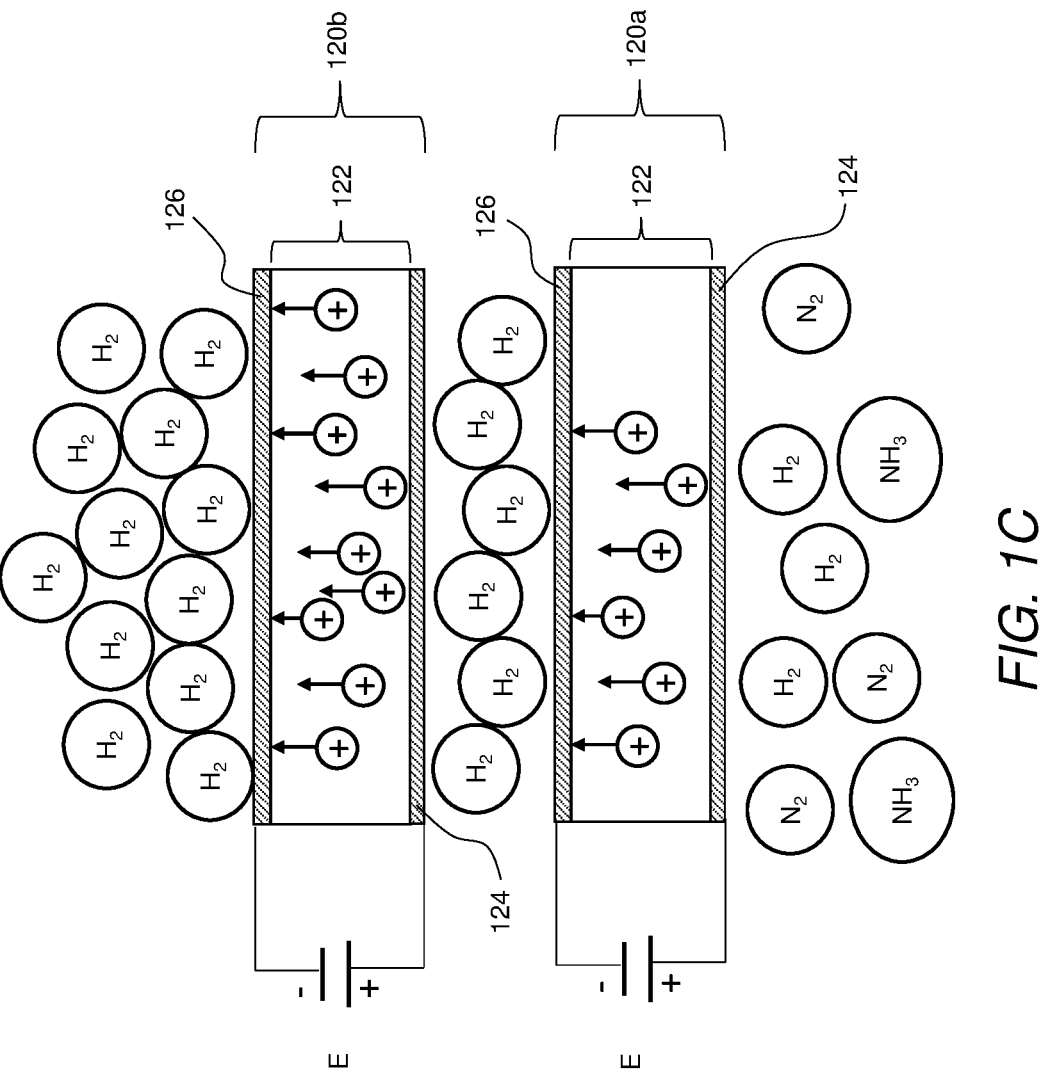
FIG. 1C is a schematic representation of electrochemical cells of a hydrogen pump of the system of FIG. 1A, with the electrochemical cells arranged in a cascading stack.

Referring now to FIGS. 1A-1C, a system 100 for synthesizing ammonia may include a reactor 102, a hydrogen pump 104, and a recirculation circuit 106 in fluid communication with one another. In certain instances, the system 100 may include a hydrogen source 108 and a nitrogen source 110 in fluid communication with an inlet portion 112 of the reactor 102. The reactor 102 may additionally, or alternatively, include an energy source 116 arranged to deliver one or more forms of energy to one or more of the reactants (e.g., hydrogen, nitrogen, or a combination thereof) received into the reactor 102 through the inlet portion 112. The interaction between the energy source 116 and the one or more reactants within the reactor 102 may produce products flowable into a product stream 118 via an outlet portion 114 of the reactor 102. For example, the energy source 116 may form ammonia through reduction of nitrogen to ammonia in the presence of hydrogen according to any one or more of various different techniques described below.

In use, the reactor 102 may have a single-pass yield below one-hundred percent and, in some cases, below single-pass yield levels associated with a Haber-Bosch reactor (e.g., a metal catalyst, such as an Fe catalyst) operated at elevated temperature (e.g., about 400° C.) and elevated pressure (e.g., about 200 atm). For example, the reactor 102 may be a low-yield reactor which, as used herein, may include a single-pass yield greater than zero percent and less than about 15 percent (e.g., about 8 percent). That is, products flowing along the product stream 118, from the outlet portion 114 of the reactor 102, may include ammonia ($NH_3$), as well as unreacted nitrogen and unreacted hydrogen. The hydrogen pump 104 may be in fluid communication between the outlet portion 114 of the reactor 102 and the recirculation circuit 106 to recover at least some of the unreacted hydrogen flowing along the product stream 118. As described in greater detail below, the hydrogen pump 104 may remove unreacted hydrogen flowing along the product stream 118 and recirculate this unreacted hydrogen to the inlet portion 112 of the reactor 102, via the recirculation circuit 106. Recirculation of hydrogen in this manner may increase the overall yield of the reactor by displacing at least a portion of the hydrogen that would otherwise be required to be formed by the hydrogen source 108 to meet the input demands of the reactor 102. Thus, the hydrogen pump 104 and the recirculation circuit 106 may ease certain constraints on one or more other aspects of the system 100 such that the system 100 may be operated safely and cost-effectively across a wider range of conditions and environments, as compared to high temperature and pressure ammonia synthesis plants. For example, as described in greater detail below, the hydrogen pump 104 and the recirculation circuit 106 may facilitate forming ammonia from air, electricity, and water with a high overall yield of the system 100 while the reactor 102 itself may be operated at conditions associated with a low, single-pass yield.

The economic viability of the hydrogen pump 104 in improving the overall yield of the system 100 may be a function of the amount of energy required to recirculate hydrogen using the hydrogen pump 104. More specifically, the amount of energy required to recirculate hydrogen using the hydrogen pump 104 may be less than the amount of energy required to operate the hydrogen source 108 to deliver an equivalent mass of hydrogen to the inlet portion 112 of the reactor 102. Accordingly, under otherwise identical operating conditions, the hydrogen pump 104 and the recirculation circuit 106 may be associated with an increased power-to-ammonia efficiency that translates into cost savings. Further, or instead, the ability to produce a given amount of ammonia using less hydrogen may reduce logistical constraints that would otherwise make the hydrogen source 108 impractical in some environments. For example, in instances in which the hydrogen source 108 includes an electrolyzer, the net reduction in hydrogen required from the electrolyzer may result in a net reduction in water required as input to the system 100. Apart from providing energy savings associated with reduced pumping requirements for the water, the reduced need for water in the system 100 may facilitate ammonia production in areas with limited access to water.

In general, the reactor 102 may receive nitrogen and hydrogen at the inlet portion 112, and the energy source 116 may direct any one or more of various different types of energy to one or both of the nitrogen or hydrogen in the reactor to promote synthesis of ammonia. That is, the energy provided by the energy source 116 may drive the reaction mechanism of ammonia synthesis at a rate faster than would be achievable without the energy from the energy source 116, under otherwise identical conditions. Such an increased rate of synthesis may correspond to an increased yield of ammonia from nitrogen and hydrogen. While this suggests that the yield of ammonia may be generally increased by increasing the energy provided by the energy source 116, the delivery of certain types or amounts of energy may be impractical, or even impossible, in some installation settings. For example, temperatures between 400-450° C. and a pressure of 200 atm are generally required to achieve economically viable single-pass yields of a catalyst in certain installations of conventional Haber-Bosch processes. Maintaining such high temperatures and pressure may not be feasible, for example, in installation settings that are resource-constrained. As described in greater detail below, however, the hydrogen pump 104 and the recirculation circuit 106 may facilitate operating the energy source 116 of the reactor 102 at low-cost conditions (e.g., lower temperatures and/or pressure than those associated with conventional Haber-Bosch processes) while still achieving profitable ammonia synthesis. In doing so, the hydrogen pump 104 and the recirculation circuit 106 may facilitate synthesizing ammonia cost-effectively in installation settings that are otherwise inaccessible using a conventional Haber-Bosch process.

In certain implementations, the reaction 102 comprises an electrochemical ammonia generation reactor (i.e., a membrane type electrochemical reactor), and the energy source 116 of the reactor 102 may include a synthesis cell (e.g., a proton-exchange membrane ("PEM") cell) 138 operable for electrochemical synthesis of ammonia from hydrogen and nitrogen. The synthesis cell 138 may include an anode 140, a cathode 142, and a medium 144. The medium 144 may be disposed between the anode 140 and the cathode 142 and, for example, may be ionically conductive to protons. As a more specific example, the medium 144 may be one or more of a proton-exchange membrane or an electrolyte. Additionally, or alternatively, the synthesis cell 138 may include a power source 146 connected to the anode 140 and to the cathode 142 to create an electric field in the medium 144 disposed between the anode 140 and the cathode 142 (i.e., to apply a voltage between the anode 140 and the cathode 142). In this embodiment, the energy provided by the energy source 116 is electrical energy (i.e., a voltage).

The hydrogen introduced into the reactor 102, via the first inlet portion 112A, may flow over the anode 140, where the hydrogen may break down into protons (represented as H⁺ in FIG. 1B) according to the following reaction:

$$3H_2 \rightarrow 6H^+ + 6e^-$$

In turn, under the electric field provided by the power source 146, the protons may flow from the anode 140 to the cathode 142 through the medium (i.e., electrolyte) 144. At the cathode 142, the nitrogen introduced into the reactor 102 via the second inlet portion 112B may flow over the cathode

142, where the nitrogen may react with the protons to form ammonia according to the following reaction:

$$N_2 + 6H^+ + 6e^- \rightarrow 2NH_3$$

Optionally, additional hydrogen may also be provided directly to the cathode in addition to the hydrogen pumped through the medium 144 from the anode 140 to the cathode 142. The foregoing reactions may be carried out under conditions that represent one or more tradeoffs. For example, while elevated temperature and/or pressure may be useful in increasing reaction rates of one or more of the foregoing reactions, considerations related to the cost of achieving and maintaining such elevated temperature and/or pressure may weigh in favor of operating the synthesis cell 138 at lower temperatures and/or pressure. For example, the synthesis cell 138 may be operated with a low single-pass yield (e.g., greater zero percent and less than about 15 percent) to facilitate implementing the synthesis cell 138 using low pressure at temperatures less than about 400° C. and at pressures less than about 200 atm, and equal to or greater than atmospheric pressure.

With the synthesis cell 138 operating at a single-pass yield significantly less than one-hundred percent, the flow moving out of the synthesis cell 138 may include ammonia, along with significant amounts of unreacted hydrogen and nitrogen. The hydrogen pump 104 may be in fluid communication with the synthesis cell 138 via the outlet portion 114 of the reactor 102 such that the significant amount of unreacted hydrogen may move through the hydrogen pump 104, as described in greater detail below. For example, ammonia and the unreacted reactants may flow out of the reactor as a single stream flowable along the product stream 118 from the outlet portion of 114 the reactor 102 to the hydrogen pump 104.

While the energy source 116 has been described as including a single instance of the synthesis cell 138, it shall be appreciated that this is for the sake of clarity and efficient description. More specifically, the energy source 116 may include additional instances of the synthesis cell 138 (e.g., as part of an electrochemical stack) without departing from the scope of the present disclosure. The number of additional instances of the synthesis cell 138 may depend, for example, on desired output from the system 100. While the energy source 116 has been described as including a synthesis cell 138, it shall be appreciated that the energy source may, additionally or alternatively, include other energy sources. For example, the energy source 116 may further, or instead, be one or more of a low-yield catalyst (e.g., a catalyst operated at temperatures and pressure less than those associated with conventional Haber-Bosch processes) or a plasma-driven reactor. That is, stated more generally, the energy source 116 may be any one or more of various different energy sources useful for delivering energy to hydrogen and nitrogen to promote the synthesis of ammonia.

In some implementations, at least a portion of the ammonia flowing in the product stream 118 may condense into a first condensate stream 128 prior to reaching the hydrogen pump 104. A first liquid drain and an optional first condenser may be located on the conduit (e.g., pipe or manifold) carrying the product stream 118 between the outlet portion of the reactor 114 and the hydrogen pump 104 to generate the first condensate stream 128. The hydrogen pump 104 may separate the unreacted hydrogen from the remaining ammonia and the unreacted nitrogen to deliver purified and pressurized hydrogen to the recirculation circuit 106 in fluid communication with the hydrogen pump 104. The remaining ammonia and unreacted nitrogen may exit the hydrogen pump 104 along an exhaust stream 130. In certain instances, the remaining ammonia may condense out of the exhaust stream 130 into a second condensate stream 132 combinable with the first condensate stream 128 to form an ammonia output stream 134. A second liquid drain and an optional second condenser may be located on the conduit (e.g., pipe or manifold) carrying the exhaust stream 130 from the hydrogen pump 104 to generate the second condensate stream 132. The remaining unreacted nitrogen in the exhaust stream 130 may be stored or exhausted to the environment in some cases.

In certain implementations, the hydrogen pump 104 may be an electrochemical membrane hydrogen pump which includes one or more electrochemical cells 120a,b. For the sake of clarity of illustration and description, the electrochemical cells 120a,b are shown as two electrochemical cells (collectively referred to as the electrochemical cells 120a,b and individually referred to as the electrochemical cell 120a and the electrochemical cell 120b). However, it shall be appreciated that the hydrogen pump 104 may include a single electrochemical cell in some instances or three or more electrochemical cells in other instances, without departing from the scope of the present disclosure. The total number of electrochemical cells in the hydrogen pump 104 may be influenced by, among other considerations, the amount of unreacted hydrogen flowing in the product stream 118 and/or the pressure required to move the unreacted hydrogen from the product stream 118 to the inlet portion 112 of the reactor 102, via the recirculation circuit 106. For example, the electrochemical cells 120a,b may be arranged in a cascading electrochemical stack to facilitate pumping (i.e., separating) hydrogen from the product stream 118 to move the hydrogen into the inlet portion 112 of the reactor 102, via the recirculation circuit 106.

Each of the electrochemical cells 120a,b may include a proton exchange membrane 122, an anode 124, and a cathode 126. For example, the proton exchange membrane 122 may be disposed between the anode 124 and the cathode 126. Electrical power E may be delivered to the anode 124 and the cathode 126 to provide a positive charge along the anode 124 and a negative charge along the cathode 126. The resulting electrical field may result in a higher pressure concentrated along the cathode 126 than along the anode 124. As an example, at the anode 124, lower pressure hydrogen may separate into protons and electrons, and the electrical field may drive protons across the proton exchange membrane 122 to the cathode 126. Continuing with this example, the protons may recombine at the cathode 126 to form hydrogen at a higher pressure. Thus, by using the output of the electrochemical cell 120a as the input to the electrochemical cell 120b, hydrogen may be pumped to even higher pressure.

As may be appreciated from the foregoing, sequential pumping of hydrogen may be repeated using as many instances of one or more of the electrochemical cells 120a,b as necessary or desirable to remove a significant amount of hydrogen from the product stream 118 and electrochemically pump the removed hydrogen to a target pressure. In general, the target pressure may be at least above a minimum pressure required to overcome flow resistance associated with the recirculation circuit 106 to deliver the recirculated hydrogen to one or more reactant streams (e.g., a hydrogen stream moving from the hydrogen source 108) at or upstream of the inlet portion 112 of the reactor 102. Pressures above the minimum pressure may be useful for, among other things, controlling the ratio of recycled hydrogen from the circulation circuit to non-recycled hydrogen from the hydrogen source 108. That is, with increasing pressure above the minimum pressure, the relative amount of recycled hydrogen used to meet the total hydrogen demand of the reactor 102 increases. The upper end of a pressure range useful for controlling the fraction of recycled hydrogen in the total hydrogen may be bounded by considerations such as, but not limited to, the total power required by the hydrogen pump 104 compared to the power required by the hydrogen source 108, hardware, safety, or combinations thereof.

In general, the recirculation circuit 106 may include any one or more of various different combinations of conduits, valves, and/or filters useful for safely moving the purified and pressurized hydrogen from the hydrogen pump 104 to the inlet portion 112 of the reactor 102. It shall be appreciated that some of the energy required to pressurize the recycled hydrogen to the target pressure is used to overcome the pressure drop in the recirculation circuit 106. That is, pressure drop of the recycled hydrogen flowing through the recirculation circuit 106 may be a source of energy loss that reduces the power-to-ammonia efficiency of the system 100. For at least this reason, it may be particularly advantageous for the recirculation circuit 106 to have a low pressure drop such that the pressure generated at the hydrogen pump 104 is efficiently used to mix the recycled hydrogen with hydrogen from the hydrogen source 108.

The hydrogen source 108 may be any one or more of various different sources of hydrogen suitable for meeting at least a portion of the hydrogen input demands of the reactor 102. For example, the hydrogen source 108 may be sized to provide all of the hydrogen required for operation of the reactor 102, such as may be useful for accommodating transient conditions (e.g., startup). Further, or instead, the hydrogen source 108 may include one or more filters or other purification devices positioned to remove contaminants from hydrogen produced by the hydrogen source 108.

The hydrogen source 108 may produce hydrogen flowable along a hydrogen stream 136 in fluid communication at least with the inlet portion 112 of the reactor 102. While the hydrogen in the hydrogen stream may be pure hydrogen in some implementations, it shall be appreciated that the hydrogen stream 136 may further include one or more components that are inert at least with respect to the hydrogen in the hydrogen stream.

In certain instances, the hydrogen in the hydrogen stream 136 may be in fluid communication with the recycled hydrogen from the recirculation circuit 106 upstream of the inlet portion 112 of the reactor 102. That is, the hydrogen moving through the inlet portion 112 of the reactor 102 may be a mixture of the hydrogen from the hydrogen source 108 and the recycled hydrogen from the recirculation circuit 106. The relative fraction of hydrogen from each source may be a function of the relative pressure of hydrogen from each source. For example, at steady state conditions, the pressure of hydrogen from one or both of the hydrogen source 108 or the recirculation circuit 106 may be substantially constant, allowing for normal fluctuations in fluid flow through the system 100.

In certain implementations, the hydrogen source 108 may include an electrolyzer, such as a proton exchange membrane (PEM) electrolyzer. For example, the hydrogen source 108 may receive purified water and electricity as inputs and produce hydrogen locally. This offers advantages in material handling as compared to transport and storage of hydrogen from one or more geographically separate sources. Further, or instead, the electricity provided to the hydrogen source 108 may be from any one or more of various different sources. In some instances, at least a portion of the electricity may be derived from solar energy or other renewable sources, such that the hydrogen produced by the hydrogen source 108 is formed using only purified water and solar energy (or other renewable energy source) as inputs. In alternative implementations, the hydrogen source 108 may be a hydrogen storage vessel, such as a hydrogen tank.

The electricity input to the hydrogen source 108 may form an electric field across the proton exchange membrane, and the purified water may be separated into oxygen and pressurized hydrogen. Advantageously, the amount of electrical power required to pump recirculated hydrogen using the hydrogen pump 104 may be significantly less than the amount of electrical power required to form pressurized hydrogen in the hydrogen source 108 including the PEM electrolyzer. For example, the power required to form hydrogen using the hydrogen source 108 may be greater than the amount of electrical power required to pump recirculated (i.e., recycled) hydrogen using the hydrogen pump 104 by a ratio of greater than about 12:1 (e.g., a ratio of about 16:1). Stated differently, the hydrogen recirculated by the hydrogen pump 104 may be a more energy efficient source of hydrogen for introduction into the reactor 102 via the inlet portion 112a of the reactor 102. Thus, for example, to facilitate achieving power-to-ammonia efficiency that may make the production of ammonia economically viable at the operating conditions associated with the synthesis cell 138, the hydrogen delivered to the inlet portion 112 of the reactor 102 may be preferentially sourced as recycled hydrogen from the hydrogen pump 104. In this context, preferentially sourcing hydrogen as the recycled hydrogen from the hydrogen pump 104 may include combining the recycled hydrogen from the hydrogen pump 104 with the pressurized hydrogen from the hydrogen stream 136 such that the mass of flow of recycled hydrogen from the hydrogen pump 104 to mass of flow of pressurized hydrogen from the hydrogen source 108 flowing into the reactor 102 via the inlet portion 112a is greater than one. This may be achieved, for example, by operating the hydrogen pump 104 and the hydrogen source 108 at respective operating conditions to produce a favorable pressure difference between the recirculated (i.e., recycled) hydrogen and the pressurized hydrogen at a point of mixing of these two streams.

While the hydrogen source 108 has been described as including a PEM electrolyzer, it shall be appreciated that the hydrogen source 108 may additionally, or alternatively, include any one or more of various different sources of hydrogen without departing from the scope of the present disclosure. For example, it shall be appreciated that the hydrogen source 108 may include any one or more of various different hydrogen production sources suitable for generating hydrogen from one or more raw materials available to be delivered to the installation setting of the system 100 in quantities sufficient to meet the hydrogen requirements of the system 100. Thus, the hydrogen source 108 may include one or more of a reformer, a borax (i.e., sodium borate) plant, a catalytic hydrogen production plant, or a combination thereof. Alternatively, the hydrogen source 108 may be a hydrogen storage vessel that is filled with hydrogen.

The nitrogen source 110 may comprise a nitrogen storage vessel, such as nitrogen tank or a device which separates oxygen and nitrogen from each other. In one embodiment, the nitrogen source 110 may remove nitrogen from air (e.g., from compressed air) to form nitrogen and nitrogen-dilute air. For example, the nitrogen source 110 may include one or more of a pressure swing adsorber, a temperature swing adsorber, a hybrid pressure and thermal swing adsorber, or a refrigeration unit. Further, or instead, the nitrogen source 110 may include an electrochemical cell operable to electrochemically pump nitrogen or oxygen from air. The outputs of the nitrogen source 110 may include nitrogen and nitrogen-depleted air (e.g., air with more than 21 percent oxygen). In certain implementations, the nitrogen-depleted air may be directed to one or more cascading stages of nitrogen removal process for separation of additional nitrogen from the nitrogen-depleted air to form more nitrogen.

In another embodiment, the nitrogen source 110 may remove oxygen from air (e.g., from compressed air) to form nitrogen-dilute air and oxygen. For example, the nitrogen source 110 may include an electrochemical cell operable to electrochemically pump oxygen from air. The outputs of the nitrogen source 110 may include oxygen and oxygen-depleted air (e.g., air with less than 21 percent oxygen) which is provided into the reactor 102. In certain implementations, the oxygen-depleted air may be directed to one or more cascading stages of oxygen removal process for separation of additional oxygen from the oxygen-depleted air to increase its nitrogen concentration. Additionally, or alternatively, the oxygen-depleted air (e.g., air with about 4 percent oxygen) from an intermediate stage of the cascading stages may be advantageously used to fill the cabinet containing hydrogen source 108 and/or the reactor 102, as may be useful to reduce the likelihood combustion of hydrogen at the hydrogen source 108 and/or the reactor 102. That is, by displacing air around the hydrogen source 108 and/or the reactor 102 with oxygen-depleted air, the concentration of oxygen in the vicinity of the hydrogen source 108 and/or the reactor 102 is decreased. In turn, the risk of combustion of hydrogen at the hydrogen source 108 and/or the reactor 102 may be decreased. In some instances, sufficient oxygen-depleted air may be used to fill one or more cabinets housing the hydrogen source 108 and/or the reactor 102 such that any mixture of hydrogen and oxygen in the vicinity of the hydrogen source or the reactor is below the combustion limit of hydrogen at the temperature and pressure of the hydrogen source 108 and/or the reactor 102. The oxygen-depleted air may be used to fill the cabinet of the hydrogen source 108 and/or the reactor 102 according to any one or more stages of operation of the system 100, such as startup, shutdown, steady-state operation, and/or under anomalous conditions.

The nitrogen (or oxygen depleted air) produced by the nitrogen source 110 may be directed to the inlet portion 112b of the reactor 102 via a nitrogen stream 148. The nitrogen flowable from the nitrogen source 110 to the reactor 102 may include certain non-oxygen impurities from the compressed air and/or from the process used to separate oxygen from the compressed air. Such impurities (e.g., carbon dioxide and/or argon) may be acceptable to the extent the given impurity does not interfere with the formation of ammonia in the system 100 and does not degrade any one or more of the various different portions of the system 100.

In some implementations, the system 100 may further, or instead, include a controller 131 in electrical communication with any one or more of the reactor 102, the hydrogen pump 104, the hydrogen source 108, and the nitrogen source 110 to control various different aspects of ammonia formation. For example, the controller 131 may control various different aspects of the system 100 to maintain the energy-to-ammonia efficiency of the system 100 above a minimum threshold and, in doing so, produce ammonia cost-effectively. Additionally, or alternatively, the controller 131 may control respective operating set-points of one or more of the hydrogen source 108, the nitrogen source 110, or the hydrogen pump 104 to match an input to the system 100 (e.g., available power input, available water input, or a combination thereof), an output of the system 100 (e.g., ammonia demand), or a combination thereof.

The controller 131 may include a processing unit 133 and a non-transitory, computer-readable storage medium 135 having stored thereon computer-readable instructions for causing the processing unit 133 to carry out any one or more of the various different techniques described herein for forming ammonia. Additionally, or alternatively, the controller 131 may include a user interface 137 (e.g., a keyboard, a mouse, a touchscreen, etc.) in electrical communication with the processing unit 133 and the computer-readable storage medium 135. In use, a user may provide inputs to the controller 131 via the user interface 137. In some instances, the user interface 137 may communicate information to the user, such as alerts (e.g., an indicator on a screen and/or an alarm sound) and/or performance parameters.

Figure 2A:
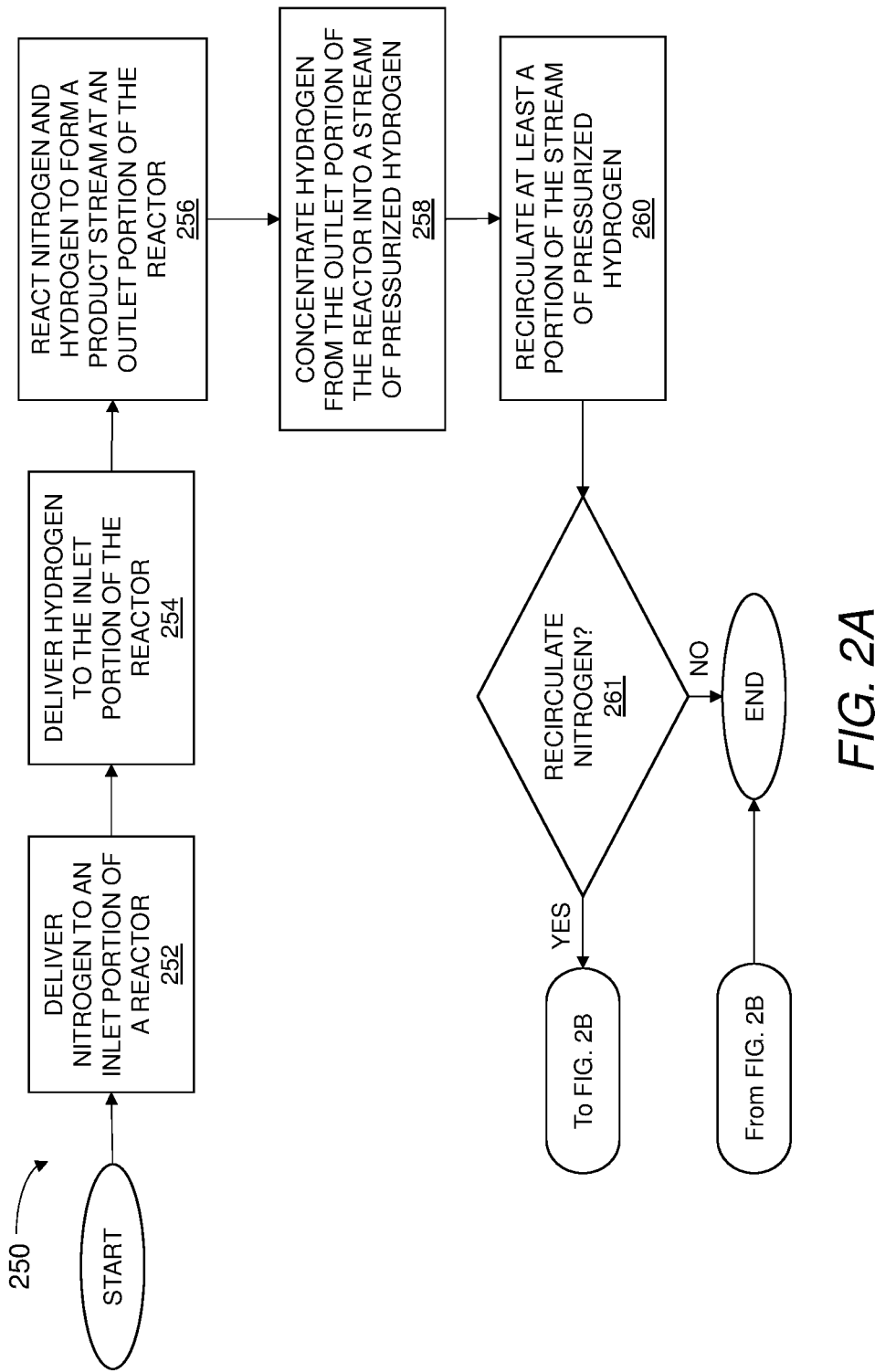
FIGS. 2A and 2B are flow charts of exemplary methods of synthesizing ammonia according to various embodiments, the methods including electrochemically pumping hydrogen and recirculating at least a portion of the electrochemically pumped hydrogen to an inlet of a reactor.

FIG. 2A is a flow chart of an exemplary method 250 of ammonia synthesis including hydrogen recirculation. Unless otherwise specified or made clear from the context, the exemplary method 250 may be implemented using any one or more of the various different systems, and components thereof, described herein. Thus, for example, the exemplary method 250 may be implemented as computer-readable instructions stored on the computer-readable storage medium 135 and executable by the processing unit 133 of the controller 131 to operate the system 100, as shown in FIG. 1A.

As shown in step 252, the exemplary method 250 may include delivering nitrogen from a nitrogen source to an inlet portion of a reactor. The nitrogen source may include any one or more of the various different nitrogen sources described herein. Thus, for example, delivering nitrogen from a nitrogen source to the inlet portion of the reactor may include removing oxygen from compressed air. For example, delivering nitrogen may include using electrochemical pumping, a pressure swing adsorption process, a thermal swing adsorption process, a hybrid pressure and thermal swing adsorption process, or a refrigeration process to separate nitrogen from air. Further, or instead, delivering nitrogen may include removing oxygen from air through electrochemical pumping. In certain instances, removing oxygen from air may include cascading oxygen removal in which progressively oxygen-depleted air is treated in each successive stage of processing. In some implementations, cascading oxygen removal may be useful for the efficient use of power to form a nitrogen stream, given that the cascading process may be performed on a single stream of compressed air. Further, or instead, cascading oxygen removal may facilitate using one or more intermediate products of the removal process as a process fluid. As an example, cascading oxygen removal may include diverting oxygen-depleted air from an intermediate stage of the of the cascade to fill the cabinet housing the hydrogen source and/or the reactor, as may be useful for reducing a likelihood of combustion of hydrogen at the hydrogen source and/or the reactor.

As shown in step 254, the exemplary method may include delivering hydrogen from a hydrogen source to an inlet portion of the reactor. The hydrogen source may include any one or more of the various different sources described herein. As an example, therefore, the hydrogen source may include a PEM electrolyzer, and delivering hydrogen from the hydrogen source may include generating hydrogen by electrolyzing purified water. Thus, in instances in which nitrogen delivered from the nitrogen source is formed using compressed air alone or in combination with electricity (e.g., such as in the case of electrochemically pumping oxygen from air), it shall be appreciated that the inputs for carrying out the exemplary method 250 of ammonia synthesis may consist of only electricity, water, and air. Continuing with this example, in implementations in which the electricity is harvested from solar panels, the inputs required for carrying out the exemplary method 250 of ammonia synthesis may be solar energy, water, and air. Similar advantages may be understood to be associated with other forms of renewable energy such as wind, geothermal, or hydro power generation.

As shown in step 256, the exemplary method 250 may include reacting nitrogen and hydrogen in the reactor to form products including ammonia, nitrogen, and hydrogen at an outlet portion of the reactor. For example, the reaction of nitrogen and hydrogen may be carried out in any one or more of the various different reactors described herein. In particular, the reacting nitrogen and hydrogen may be carried out in a reactor having a single-pass yield greater than zero and less than about 15 percent. As discussed above, this range is significant because it is below the minimum economically viable yield associated with conventional Haber-Bosch ammonia synthesis. Thus, in some implementations, reacting the nitrogen and hydrogen in the reactor may include reacting nitrogen and hydrogen in a Haber-Bosch reactor operating at conditions that—although more easily attainable and controllable—are not typically used because such conditions result in ammonia yields that are below the economically viable minimum. For example, reacting nitrogen and hydrogen to form products may include reacting these reactants in a Haber-Bosch reactor operating at less than about 400° C. and less than about 200 atm.

As shown in step 258, the exemplary method 250 may include concentrating unreacted hydrogen from the outlet portion of the reactor into a stream of pressurized hydrogen. For example, concentrating hydrogen from the products including ammonia, nitrogen, and hydrogen may include electrochemical pumping of hydrogen according to any one or more of the various given techniques described herein. Thus, for example, concentrating hydrogen may include electrochemically pumping hydrogen using a plurality of electrochemical cells. In certain implementations, the plurality of electrochemical cells may form at least a portion of a cascading electrochemical cell arrangement.

In general, the power required to for electrochemical pumping of hydrogen moving from the outlet portion of the reactor may require less power than delivering hydrogen (e.g., forming pressurized hydrogen) from the hydrogen source to the reactor. In instances in which the single-pass yield of the reactor is low, there may be a significant amount of unreacted hydrogen in the products. Accordingly, in such instances, the power difference between electrochemically pumping unreacted hydrogen as compared to the power required to deliver hydrogen from the hydrogen source may be significant. In turn, cost savings associated with electrochemically pumping unreacted hydrogen from the products may also be significant. As an additional or alternative advantage, pumping unreacted hydrogen from the products may reduce, or even eliminate, certain operating and/or equipment costs associated with safely handling large amounts of hydrogen downstream.

As shown in step 260, the exemplary method 250 may include recirculating at least a portion of the stream of pressurized hydrogen to the inlet portion of the reactor. For example, recirculating at least a portion of the stream of the pressurized hydrogen may include moving pressurized hydrogen through a recirculation circuit having a relatively low pressure drop such that only a small amount of energy required to pressurize the hydrogen is required to overcome the pressure drop in the recirculation circuit. Additionally, or alternatively, at least during a steady state condition, the mass flow rate of the pressurized hydrogen moving to the inlet portion of the reactor may be controlled by varying the pressure of the hydrogen.

In certain implementations, one or more of delivering nitrogen from the nitrogen source (step 252), delivering hydrogen from the hydrogen source (step 254), reacting nitrogen and hydrogen (step 256), concentrating hydrogen (step 258), or recirculating at least a portion of the pressurized stream of hydrogen (step 260) may be controlled to respective operating setpoints. Such operating setpoints may be, for example, a function of one or more input or output considerations associated with ammonia synthesis from hydrogen and nitrogen. For example, one or more of the setpoints may be based on available power input, available water input, or a combination thereof. Further, or instead, one or more of the setpoints may be based on ammonia output demand.

Having described various aspects of the system 100 shown in FIGS. 1A-1C for ammonia synthesis and some aspects of the exemplary method 250 shown in FIGS. 2A, for ammonia synthesis using apparatus such as the system 100, attention is directed now to describing additional or alternative implementations of systems and methods of ammonia synthesis. For the sake of clear and efficient description, elements having numbers with the same last two digits shall be should be understood to be analogous to or interchangeable with one another, unless otherwise explicitly made clear from the context and, therefore, are not described separately from one another, except to note differences or emphasize certain features. Thus, for example, the reactor 102 of FIGS. 1A-1C shall be understood to be analogous to a reactor 302 of FIG. 3, unless otherwise indicated or made clear from the context.

Figure 3:
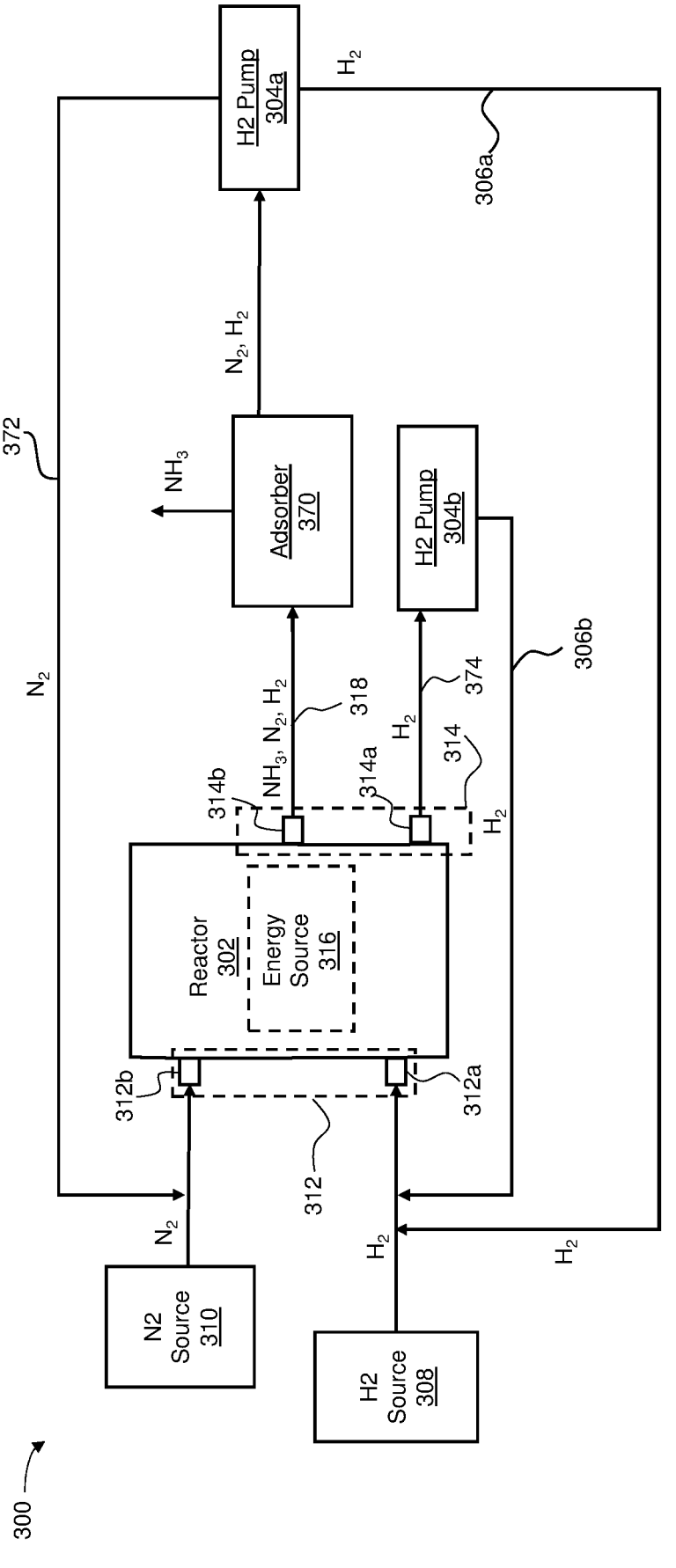
FIG. 3 is a block diagram of a system of a second embodiment for synthesizing ammonia, the system including a hydrogen pump recycling hydrogen and nitrogen as inputs to a reactor.

Referring now to FIGS. 1B and 1C and FIG. 3, a system 300 may adsorb ammonia to facilitate recirculating hydrogen, nitrogen, both. For example, the system 300 may include a reactor 302, a first hydrogen pump 304a, a second hydrogen pump 304b, a hydrogen source 308, and a nitrogen source 310. The hydrogen source 308 and the nitrogen source 310 may each be in fluid communication with an inlet portion 312 of the reactor 302 to deliver nitrogen and hydrogen, respectively, to the reactor 302. The reactor 302 may comprise an electrochemical (e.g., membrane) reactor and may include the synthesis cell 138 shown in FIG. 1B. Accordingly, ammonia may be synthesized from nitrogen and hydrogen according to any one or more of the various different electrochemical techniques described herein. Thus, hydrogen may flow into the reactor 302 via the inlet portion 312a and along the anode 140 of the cell 138, where at least a portion of the hydrogen may be broken down into protons movable to the cathode 142 through the medium 144. Nitrogen may flow into the reactor 302 via the inlet portion 112b and along the cathode 142, where at least a portion of the nitrogen may react with the protons to form ammonia.

In general, the synthesis cell 138 may have a single-pass yield of less than one-hundred percent. Stated differently, at least a portion of the hydrogen moving along the anode 140 may remain unreacted, and at least a portion of the nitrogen moving along the cathode 142 may remain unreacted. Further, at least a portion of the protons moving from the anode 140 to the cathode 142, through the medium 144, may recombine to form hydrogen that remains unreacted. Thus, taken together, it shall be appreciated that the stream 374 exiting a first outlet portion 314a of the reactor 302 from the anode 140 of the cell may include excess hydrogen which has not moved across the medium (e.g., electrolyte) 144 of the cell 138. The product stream exiting the second outlet portion 314b of the reactor 302 from the cathode 142 may include ammonia as well as unreacted nitrogen and unreacted hydrogen which moved across the medium from the anode 140 to the cathode 142.

In certain implementations, a product stream 318 may be in fluid communication between an adsorber 370 and an outlet portion 314 (e.g. the second outlet portion 314b) of the reactor 302. The adsorber 370 may be, for example, a bed of activated carbon or another suitable adsorption material which adsorbs either ammonia or hydrogen and nitrogen by pressure or temperature swing adsorption. Further, the adsorber 370 may be in fluid communication with a first hydrogen pump 304a. For example, the adsorber 370 may be in fluid communication with the cathode 142 of the cell 138 via the second outlet portion 314b of the reactor 302. That is, the product stream 318 flowing between the second outlet portion 314b and the absorber may include ammonia, unreacted nitrogen, and unreacted hydrogen. As these products flow into the adsorber 370, ammonia may be removed from the flow of products.

With ammonia removed from the products, the remaining mixture—namely, unreacted nitrogen and unreacted hydrogen—may be separated from one another in the first hydrogen pump 304a. Once separated, one or both of the unreacted hydrogen or the unreacted nitrogen may be recirculated to the reactor 102. As may be appreciated, such recirculation may advantageously reduce the energy required to form hydrogen and/or nitrogen as inputs to the reactor 102.

In certain implementations, the unreacted nitrogen and the unreacted hydrogen flowing from the adsorber 370 may be separated from one another as a mixture including these components moves through the first hydrogen pump 304a. More specifically, the unreacted hydrogen and the unreacted nitrogen may be separated from one another by moving the mixture of unreacted hydrogen and unreacted nitrogen through one or more of the electrochemical cells 120a,b. The electrochemical pumping may produce two separate output streams—one output stream including pressurized hydrogen and another output stream including unreacted nitrogen. The first hydrogen pump 304a may be in fluid communication with the first inlet portion 312a of the reactor 302 via a first recirculation circuit 306a to direct the pressurized hydrogen from the first hydrogen pump 304a to mix with hydrogen produced by the hydrogen source 308.

In some implementations, the first hydrogen pump 304a may further, or instead, be in fluid communication with the second inlet portion 312b of the reactor 302 via a nitrogen circuit 372. For example, the nitrogen circuit 372 may direct unreacted nitrogen from the first hydrogen pump 304a to mix with nitrogen produced by the nitrogen source 310. It shall be appreciated that such recirculation of unreacted nitrogen may displace at least a portion of the nitrogen required to be formed by the nitrogen source 310. Given that nitrogen is a byproduct of the first hydrogen pump 304a, there is no energy cost to the production of nitrogen by the first hydrogen pump 304a. Accordingly, recirculation of nitrogen to displace nitrogen production by the nitrogen source 310 increases the energy-to-ammonia efficiency of the system 300, as compared to an otherwise identical system without nitrogen recirculation.

In some implementations, the system 300 may additionally, or alternatively, include a second hydrogen pump 304*b* in fluid communication with the first outlet portion 314*a* of the synthesis cell 138 of the reactor 302. As hydrogen flows along the anode 140, a portion of the hydrogen introduced through the inlet portion 312 of the reactor 302 may flow through the medium 144 of the synthesis cell 138, while the remainder of the hydrogen may bypass the synthesis cell 138 and exit as a bypass stream 374 from the first outlet portion 314*a* of the reactor 302. In turn, the bypass stream 374 may flow to the second hydrogen pump 304*b*, where the hydrogen may be electrochemically pumped by one or more electrochemical cells 120*a,b* according to any one or more of the various different techniques described herein.

The system 300 may additionally include a second recirculation circuit 306*b* in fluid communication between the second hydrogen pump 304*b* and the first inlet portion 312*a* of the reactor 302. Thus, the bypass stream 374 may be formed into a pressurized hydrogen stream by the second hydrogen pump 304*b*, and this pressurized hydrogen stream may be combined with a hydrogen stream produced by the hydrogen source 308 and/or with a pressurized hydrogen stream recirculated by the first hydrogen pump 304*a* via circuit 306*a*. In some instances, treating the hydrogen containing product stream 318 separately from the hydrogen containing bypass stream 374 may be useful for achieving additional improvements in efficiency, as compared to a system that combines all of the output of the reactor into a single stream but is otherwise identical to the system 300. For example, because the bypass stream 374 does not undergo a pressure drop through the synthesis cell 138 and/or the adsorber 370, the hydrogen entering the second hydrogen pump 304*b* may have a higher pressure than the hydrogen entering the first hydrogen pump 304*a*. Accordingly, the second hydrogen pump 304*b* may be smaller than the first hydrogen pump 304*a* and, thus, require less energy to form pressurized hydrogen. This reduced energy requirement may increase the energy-to-ammonia efficiency of the system 300, as compared to an otherwise identical system that forms a pressurized hydrogen stream using a single hydrogen pump.

Figure 2B:
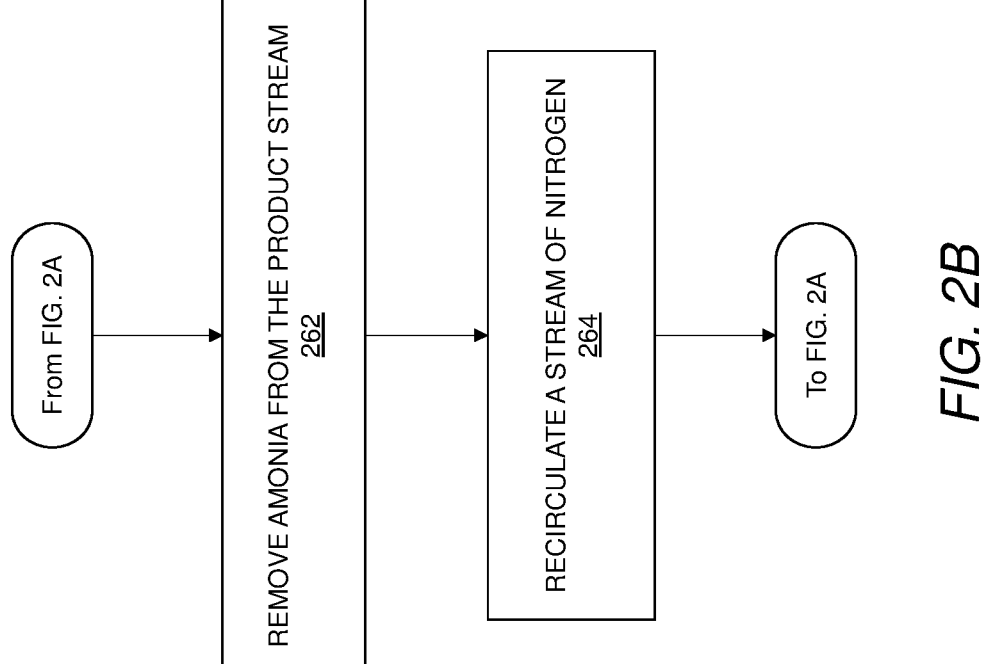

Referring now to FIGS. 2A and 2B, the exemplary method 250 of ammonia synthesis may be carried out using the system 300 shown in FIG. 3. For example, the adsorption of ammonia using system 300 may facilitate recirculating nitrogen as part of the exemplary method 250.

As shown in step 261 of FIG. 2A, the exemplary method 250 may include determining whether nitrogen is to be recirculated. The decision to recirculate nitrogen may be based on one or more of a variety of factors. For example, in some instances, an adsorber or other equipment used to remove ammonia from a product stream may become saturated and taken off-line for regeneration. In such instances, it may be useful to continue ammonia production (e.g., allowing the ammonia to condense) while certain ammonia removal equipment is off-line, albeit without the efficiency benefit of recirculation of nitrogen. Further, or instead, the determination of whether nitrogen is to be recirculated may be based on whether nitrogen is advantageously used elsewhere in the system (e.g., to flood the hydrogen source).

As shown in step 262 of FIG. 2B, if the exemplary method 250 includes nitrogen recirculation, the exemplary method 250 may include removing ammonia flowing along the product stream from the outlet portion of the reactor. With ammonia removed from the product stream, the remaining components of the flow are unreacted hydrogen and unreacted nitrogen. In such instances, concentrating hydrogen from the outlet portion of the reactor may include introducing the mixture of hydrogen and nitrogen as inputs for electrochemical pumping by a hydrogen pump. The resulting electrochemical pumping may separate the hydrogen from the nitrogen to form a pressurized hydrogen stream that is discrete from a stream of unreacted nitrogen.

As shown in step 264, the exemplary method 250 may include recirculating the stream of unreacted nitrogen to the inlet portion of the reactor, where the recirculated nitrogen may mix with the nitrogen from the nitrogen source. In particular, the recirculated nitrogen may displace at least a portion of the nitrogen that would otherwise be required from the nitrogen source. In doing so, the recirculation of nitrogen may reduce the overall power required to synthesize a given amount of ammonia.

Figure 4:
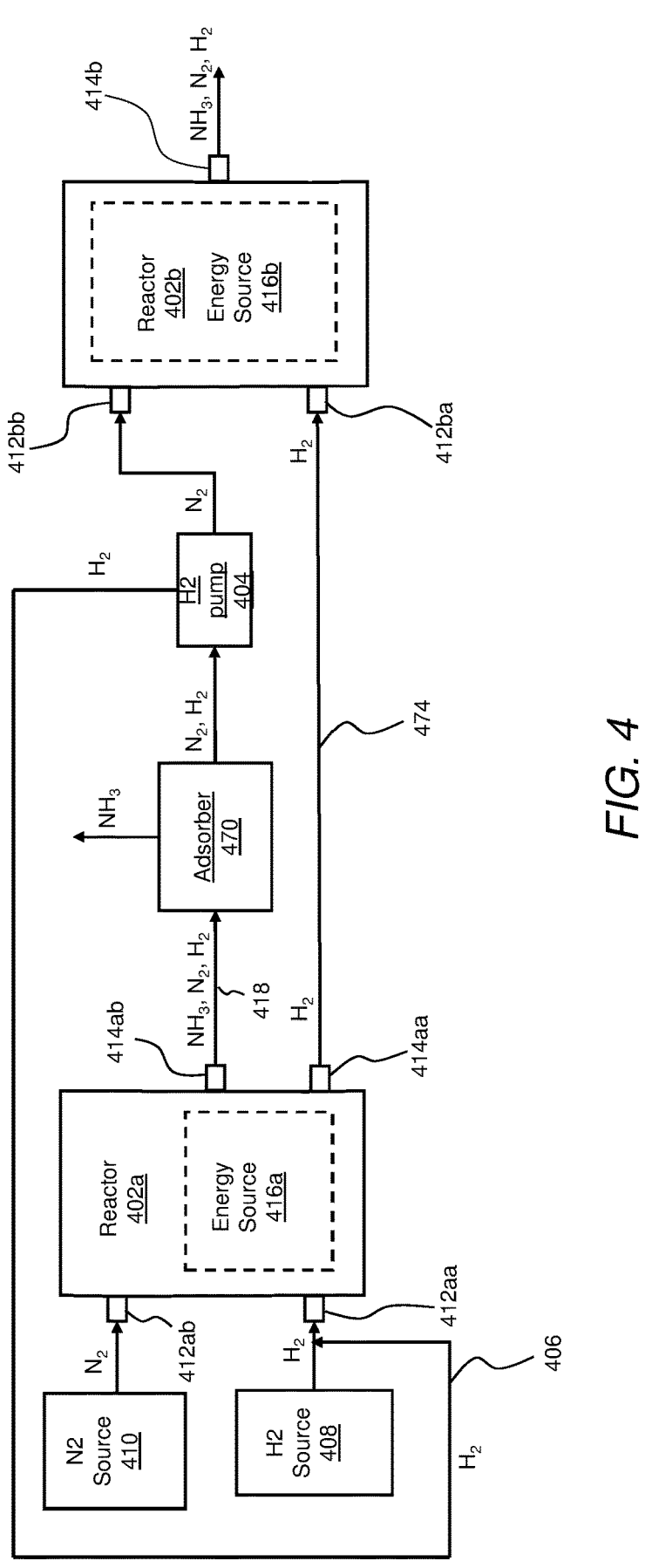
FIG. 4 is a block diagram of a system of a third embodiment for synthesizing ammonia, the system including cascading synthesis of ammonia.

Having described various systems including a hydrogen pump for forming at least a portion of the inputs to a single reactor, it shall be appreciated that other configurations are additionally or alternatively possible. For example, referring now to FIG. 4, a system 400 may include a first reactor 402*a*, a second reactor 402*b*, a hydrogen pump 404, a hydrogen source 408, a nitrogen source 410, and an adsorber 470. The hydrogen source 408 and the nitrogen source 410 may each be in fluid communication with respective first and second inlet portions 412*aa*, 412*ab* of the first reactor 402*a*. The first reactor 402*a* may include an energy source 416*a* including an electrochemical cell (e.g., the synthesis cell 138 shown in FIG. 1B).

A product stream 418 may be in fluid communication between the adsorber 470 and a second outlet portion 414*ab* of the first reactor 402*a*. Thus, for example, products from the electrochemical synthesis of ammonia from hydrogen and nitrogen may flow along in the product stream 418, in a direction from the second outlet portion 414*ab* of the first reactor 402*a* to the adsorber 470. More specifically, the products flowing along the product stream 418 may include ammonia, unreacted nitrogen, and unreacted hydrogen. In certain implementations, substantially all of the ammonia flowing into the adsorber 470 may be removed from the product stream 418 to leave a mixture of unreacted nitrogen and unreacted hydrogen.

The adsorber 470 may be in fluid communication with the hydrogen pump 404. The mixture of unreacted nitrogen and unreacted hydrogen flowing from the adsorber 470 may enter the hydrogen pump 404. The hydrogen pump 404 may include any one or more of the various different electrochemical cells described herein (e.g., the electrochemical cells 120*a,b*). Thus, for example, the hydrogen pump 404 may separate the unreacted hydrogen from the unreacted nitrogen by electrochemically pumping the unreacted hydrogen from the mixture that flows into the hydrogen pump 404 from the adsorber 470.

The system 400 may include a recirculation circuit 406 in fluid communication between the hydrogen pump 404 and the first inlet portion 412*aa* of the reactor 402. The pressurized hydrogen formed by the hydrogen pump 404 may be recirculated to the first inlet portion of 412*aa* of the reactor 402 via the recirculation circuit 406. Thus, the pressurized hydrogen from the hydrogen pump 404 may displace at least a portion of the hydrogen that would otherwise be required to be produced by the hydrogen source 408 to meet the hydrogen demand of the first reactor 402*a*.

The hydrogen pump 404 may be in fluid communication with a second inlet portion 412*bb* of the second reactor 402*b*. For example, as the hydrogen pump 404 separates unreacted hydrogen from unreacted nitrogen and pressurizes the unreacted hydrogen, the unreacted nitrogen may flow from the hydrogen pump 404 into the second inlet portion 412*bb* of the second reactor 402*b*. In certain instances, the second reactor 402*b* may include an energy source 416*b*, such as a synthesis cell (e.g., the synthesis cell 138 of FIG. 1B). Thus, in this way, nitrogen that is unreacted in the first reactor 402*a* may be, ultimately, directed as an input to the second reactor 402*b*. Further, the recirculation circuit 406 may direct the pressurized hydrogen to the first inlet portion 412*aa* of the first reactor 402*a* to satisfy a portion of hydrogen demand of the first reactor 402*a*. In doing so, the hydrogen pump 404 and the recirculation circuit 406 may reduce the power required by the hydrogen source 408 and facilitate achieving further gains in the energy-to-ammonia efficiency of the system 400.

In some implementations, the system 400 may include a bypass stream 474 in fluid communication between the first outlet portion 414*aa* of the first reactor 402*a* and the first inlet portion 412*ba* of the second reactor 402*b*. In instances in which the energy source 416*a* of the first reactor 402*a* includes a synthesis cell (e.g., the synthesis cell 138 in FIG. 1B), a portion of the hydrogen introduced into the first reactor 402*a* and flowing along an anode side of the synthesis cell may bypass the synthesis cell and flow into a conduit carrying the bypass stream 474 via the first outlet portion 414*aa* of the first reactor 402*a*. The hydrogen bypass stream 474 may flow into the energy source 416*b* via the first inlet portion 412*ba* of the second reactor 402*b*. Collectively, therefore, the system 400 may source at least a portion of the reactants (e.g., nitrogen and hydrogen) for the second reactor 402*b* from one or more flows that have moved through the first reactor 402*a* in a cascaded configuration.

The system 400 has been described as having two reactors—the first reactor 402*a* and the second reactor 402*b*. It shall be appreciated, however, that this is for the sake of clear and efficient explanation and that any number of additional reactors may be connected to one another in an analogous manner. Thus, for example, the second reactor 402*b* may include an outlet portion 414*b* in fluid communication with a third reactor in a manner analogous to the fluid communication between the first reactor 402*a* and the second reactor 402*b*. Likewise, the third reactor may be in fluid communication with a fourth reactor, and so forth.

Figure 5:
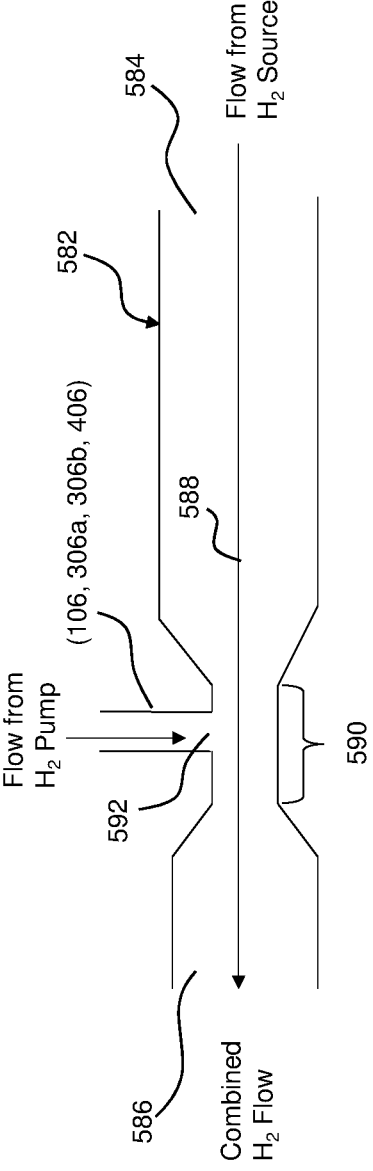
FIG. 5 is a schematic diagram of a Venturi system according to an embodiment.
Figure 5:

As another example, while systems for ammonia synthesis have been described as including recirculation circuits having low pressure drops and controlling mass flow rate of hydrogen into a reactor by varying pressure of the recirculated hydrogen, it shall be appreciated that the use of Venturi mixing may be useful for enhancing the recirculation rate of pressurized hydrogen from a hydrogen pump in any one or more of the various different systems described herein. For example, referring now to FIG. 5, a Venturi system 580 may include a conduit (e.g., a pipe) 582 defining a first inlet 584 and an outlet 586 in fluid communication with one another through a flow path 588 defined by the conduit 582 therebetween. A throat 590 is located in the conduit 582 along the flow path 588, between the first inlet 584 and the outlet 586. The throat 590 may comprise a narrowed section (e.g., having a smaller diameter) of the conduit 582 compared to the diameter of the conduit 582 at the first inlet 584 and the outlet 586. The Venturi system 580 also includes a second inlet 592 at the throat 590 of the conduit 582. The second inlet is connected to the conduit of the recirculation circuit (106, 306*a*, 306*b* or 406).

In use, recirculated hydrogen from a hydrogen pump (e.g., any one or more of the electrochemical pumps described herein) flowing in the conduit of the recirculation circuit flows into the throat 590 through the second inlet 592, while hydrogen from a hydrogen source (e.g., a PEM electrolyzer) (108, 308 or 408) flows along flow path 588 in the conduit 582. The throat 590 causes the hydrogen flowing along flow path 588 to accelerate and draw in the hydrogen flowing from the hydrogen pump into the second inlet 592 and mix with the hydrogen flowing along the flow path 588.

For example, hydrogen from a hydrogen source may flow into the first inlet 584 and flow along the flow path 588 in a direction toward the outlet 586. Recirculated hydrogen from a hydrogen pump may flow into the second inlet 592 at the throat 590. As the hydrogen from the hydrogen source reaches the throat 590, the pressure in the flow drops and, thus, increases the pressure differential between the hydrogen from the hydrogen source and the recirculated hydrogen flowing into the throat 590 via the second inlet 592. With this increase in pressure differential, the recirculation rate of hydrogen to a reactor may be enhanced.

In an alternative configuration, the pressurized recirculated hydrogen from the hydrogen pump may flow along the flow path 588 in the conduit 582 and the hydrogen from the hydrogen source is provided into the Venturi system 580 through the second inlet 592. In this configuration, the recirculated hydrogen draws the hydrogen from the hydrogen source into the Venturi system 580.

As still another example, while recirculation circuits have been described as directing recirculated hydrogen to mix with hydrogen from a hydrogen source for input to a reactor, it shall be appreciated that any one or more of the various different recirculation circuits described herein may direct at least a portion of a flow of recirculated hydrogen to one or more other portions of a given system. For example, any one or more of the various different recirculation circuits described herein may direct at least a portion of a pressurized hydrogen stream from a hydrogen pump to mix with the product stream of a nitrogen source to inert oxygen impurities in the product stream of the nitrogen source. That is, in instances in which nitrogen is formed by removing oxygen from air, the removal process may nevertheless leave behind a small amount of oxygen mixed with nitrogen. In certain types of reactors, such as electrochemical reactors, the presence of this small amount of oxygen may act as an impurity and, thus, may be advantageously reacted with the hydrogen to form small amounts of water that may be separated from the nitrogen directed toward the reactor.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of the disclosure.

What is claimed is:

1. A system for synthesizing ammonia, comprising:
a reactor including
   an inlet portion, and
   an outlet portion, and an energy source arranged to deliver energy to one or more reactants receivable through the inlet portion of the reactor, and the energy source activatable to reduce nitrogen to ammonia in the presence of hydrogen, wherein the energy source includes a catalyst or a plasma source;
a nitrogen source that provides nitrogen to the reactor through fluid communication with the inlet portion of the reactor;
at least one hydrogen pump in fluid communication with the outlet portion of the reactor, each hydrogen pump comprising at least one electrochemical cell; and
a recirculation circuit in fluid communication between the at least one hydrogen pump and the inlet portion of the reactor configured to direct a respective hydrogen stream from each hydrogen pump to the inlet portion of the reactor.

2. The system of claim 1, wherein the at least one hydrogen pump comprises a plurality of electrochemical cells arranged in a cascading electrochemical stack.

3. The system of claim 1, wherein the nitrogen source comprises one or more of a pressure swing adsorber, a temperature swing adsorber, or a refrigeration unit.

4. The system of claim 1, wherein the nitrogen source is configured to separate nitrogen from air provided to the nitrogen source.

5. The system of claim 1, wherein the nitrogen source comprises an oxygen pump activatable to separate oxygen from nitrogen.

6. The system of claim 1, further comprising a hydrogen source in fluid communication with the inlet portion of the reactor.

7. The system of claim 6, wherein the hydrogen source comprises a proton exchange membrane (PEM) electrolyzer, and the at least one hydrogen pump uses less power than the PEM electrolyzer to deliver hydrogen to the inlet portion of the reactor.

8. The system of claim 6, wherein the hydrogen source comprises one or more of a hydrogen storage vessel, a reformer, a borax plant, or a catalytic hydrogen production plant.

9. The system of claim 1, wherein the reactants comprise nitrogen and hydrogen.

10. The system of claim 1, wherein the catalyst comprises a metal catalyst.

11. The system of claim 10, wherein the metal catalyst comprises a Fe catalyst.

12. The system of claim 1, further comprising a controller in electrical communication with one or more of the reactor, the at least one hydrogen pump, or the nitrogen source.

13. The system of claim 1, further comprising an adsorber in fluid communication with the at least one hydrogen pump.

* * * * *